United States Patent [19]

Ginn

[11] Patent Number: 4,477,422

[45] Date of Patent: Oct. 16, 1984

[54] REDUCING SLURRY VISCOSITY OF KAOLINITIC CLAYS

[76] Inventor: Michael W. Ginn, 1222 Chennault Dr., Dublin, Ga. 31021

[21] Appl. No.: 451,339

[22] Filed: Dec. 20, 1982

Related U.S. Application Data

[63] Continuation-in-part of Ser. No. 428,015, Sep. 30, 1982, abandoned, which is a continuation of Ser. No. 327,703, Dec. 8, 1981, abandoned.

[51] Int. Cl.$^3$ .................. C01B 33/26; C01B 33/02
[52] U.S. Cl. ................... 423/327; 423/111; 423/131; 501/146; 501/147
[58] Field of Search ............ 423/111, 131, 327; 501/145, 147, 146

[56] References Cited

U.S. PATENT DOCUMENTS

| | | | |
|---|---|---|---|
| 2,000,338 | 5/1935 | Kliefoth | 501/147 |
| 2,307,239 | 1/1943 | Rowland | 423/328 |
| 2,987,405 | 6/1961 | Baumann et al. | 501/147 |
| 2,995,458 | 8/1961 | Murray | 106/288 |
| 3,309,211 | 3/1967 | Weiss et al. | 501/147 |
| 3,400,002 | 9/1968 | Bauer | 106/309 |
| 3,674,521 | 7/1972 | Noble | 501/147 |
| 3,725,528 | 4/1973 | Banin | 423/328 |
| 3,837,877 | 9/1974 | Bertorelli | 423/328 |
| 3,846,147 | 11/1974 | Tapper | 501/147 |
| 4,001,362 | 1/1977 | Delmon et al. | 501/147 |
| 4,042,666 | 8/1977 | Rice et al. | 423/555 |
| 4,088,732 | 5/1978 | Maynard et al. | 501/147 |
| 4,105,466 | 8/1978 | Kunkle et al. | 106/288 B |
| 4,342,729 | 8/1982 | Garciaclavel et al. | 423/131 |

FOREIGN PATENT DOCUMENTS 15911 of 1892 United Kingdom ................ 501/147

OTHER PUBLICATIONS

Kunze et al., X-Ray Characteristics of Clay Materials as Related to Potassium Fixation, Soil Science Proeedings 1953, pp. 242–244.

Van der Marel, Potassium Fixation in Dutch Soils, Mineralogical Analysis, Soil Science, vol. 78, #3, Sep. 1954, pp. 163–177.

White, Transformation of Illite to Montmorillonite Soil Science Proceedings 1950, pp. 129–133.

Weaver, The Effects and Geological Significance of Potassium "Fixation" by Expandable Clay Minerals Derived from Muscovite, Biotite, Chlorite and Volcanic Materials, The American Mineralogists, vol. 43, Sep., Oct. 1958, pp. 839–861.

*Primary Examiner*—Gary P. Straub
*Attorney, Agent, or Firm*—Sutherland, Asbill & Brennan

[57] ABSTRACT

The low shear, slurry viscosity of a kaolinitic clay that is contaminated with one or more forms of expanding clay is reduced by mixing the clay with a source of cationic potassium and then heating the potassium-treated clay to a temperature of at least about 100° C.

25 Claims, No Drawings

REDUCING SLURRY VISCOSITY OF KAOLINITIC CLAYS

This application is a continuation-in-part of application Ser. No. 428,015, filed Sept. 30, 1982, which latter application was in turn a continuation of application Ser. No. 327,703, filed Dec. 8, 1981, both now abandoned.

This invention relates to a process for reducing the low shear, slurry viscosity of a kaolinitic clay that is contaminated with one or more forms of expanding clay, such as degraded illite. More particularly, it relates to a chemical treatment of certain high viscosity kaolin clays that are presently valued only as marginal reserves, to reduce their inherent viscosities in an economic manner and enable them to be used efficiently as paper coatings.

Kaolinitic clays, i.e., clays that are composed primarily of the mineral kaolinite, have various uses. One important use is as a coating material for paper, e.g., for preparing the glossy paper preferred for printing magazines.

When a kaolinitic clay is processed or handled, it is often preferred that it be in the form of an aqueous slurry. As compared to the dry bulk form, slurries are easier to handle and cause fewer environmental problems. The shipping of kaolin in slurry form has been gaining greater acceptance in recent years, despite the fact that the water adds significantly to the weight of such shipments. Kaolin users often need to have the clay in slurry form before they can use it; therefore, by receiving it already suspended in water, they receive the added benefit of not having to subject it to the slurrying step that is required when the clay is shipped to them in bulk form. Such slurries will typically contain about 70 to 71 weight percent solids.

A clay slurry is only easy to handle, however, if its low shear viscosity is sufficiently low to permit it to be pumped without great difficulty. High grade kaolin deposits provide clays that have good rheological properties and require no treatment to lower their slurry viscosities to an acceptable level. Many kaolin deposits are inferior in that respect, however, and must be treated chemically or mechanically to reduce their low shear slurry viscosities before they can be used. Many of these inferior kaolins are presently considered uneconomical to treat or to blend with lower viscosity kaolin and are presently held as marginal reserves. If there were some method of economically improving their rheological properties, these deposits would have greatly increased value.

Much of the kaolinitic clay in marginal reserves today is contaminated with one or more forms of expanding clay. Probably a majority of the gray clays in the central and eastern Georgia kaolin districts have expanding clay impurities. By "expanding clay" is here meant a clay having a dynamic lattice structure in the c dimension. Examples of such clays are well known and include montmorillonite, sauconite, vermiculite, nontronite, saponite, hectorite, and various forms of degraded illite.

I have concluded that expanding clays present as impurities in high viscosity kaolinitic clays often include forms of degraded illite. Examples of these impurities are the vermiculite-like minerals derived from the weathering of muscovite and illite (Kunze and Jeffries, Soil Sci. Soc. Amer. Proc., vol. 17, 242-244; Van der Marel, Soil Sci. vol. 78, 163-179) and the montmorillonite-like minerals resulting from the more severe weather of the same materials (White, Soil Sci. Soc. Amer. Proc., vol. 15, 129-133). The process of the present invention is especially directed to the treatment of kaolin that is contaminated with one or more forms of degraded illite.

For purposes of the present description, the term "degraded illite" is not intended to embrace the smectite family of expanding clays. I intend to differentiate between those two types of clay on the basis of the ability of degraded illite to absorb potassium at room temperature from a 10 weight percent solution of potassium chloride and, after room temperature drying, exhibit a resultant contraction of its lattice structure in the c dimension. Some degraded illites will absorb sufficient potassium in that manner to raise their $K_2O$ content to as much as 3 percent or more (dry weight basis) from an initial $K_2O$ content of less than 2 percent. After being dried at room temperature, the KCl-treated material might exhibit a c-dimension value of as low as 11 angstroms (A.) or less, as compared to a pre-treatment value of about 16 A. or more for the expanded mineral.

The smectite family of clays, on the other hand, which include typical montmorillonite, will not contract as a result of such treatment. That is how the two types of clay can be differentiated.

I have found that the low shear, slurry viscosity of a kaolinitic clay that is contaminated with one or more forms of expanding clay can be reduced by a process comprising the steps of (a) intimately admixing the clay with a source of cationic potassium and (b) heating the potassium-treated clay to a temperature of at least about 100° C. It is believed that the potassium cation is absorbed into the lattice structure of the expanding clay and that the heat treatment stabilizes the potassium there. Where the expanding clay impurity is degraded illite, it is believed that the effect of the process is to cause that mineral to revert in form to normal illite. Very often, the high shear viscosity of the clay is also reduced by the treatment of the present invention. The principal objective of the treatment, however, is to reduce the clay's low shear viscosity.

The kaolinitic clay that is treated according to the process of the present invention presently has an expanding clay content of about 2 or 3 to 15 weight percent, on a dry solids basis. The process is perhaps most useful in treating those clays in which at least 50 weight percent of the expanding clay content is made up of degraded illite.

The treatment of the present invention is more likely to be cost effective if the clay, prior to treatment, has a low shear minimum viscosity at 20 rpm of at least about 1000 centipoises, e.g., about 2000 to 5000 centipoises, as determined at 70 to 71% solids content by TAPPI Procedure No. T 648 su-72. These viscosity values would be as measured with the pH of the clay adjusted to that point within the range of about 6 to 8 at which the clay exhibits the lowest low shear viscosity.

The treatment of the present invention is especially useful in the processing of marginal reserve kaolin clays to be used in paper coatings. Preferably such clays will be fractionated prior to the treatment, so that at least 50 percent, preferably about 75 or 80 percent or more, of the particles (based on the dry weight of the clay) will have equivalent spherical diameters of less than 2 microns.

Any K+ compound that demonstrates a lattice contraction of degraded illite may be used in the process.

Preferred sources of potassium cation for the treatment of the present invention are water-soluble potassium compounds, e.g., potassium hydroxide, potassium bicarbonate, potassium carbonate, potassium sulfate, potassium chloride, and potassium citrate. Based upon the data gathered thus far, potassium bicarbonate appears to be the best choice. Potassium chloride performs about as well, or better, than potassium bicarbonate, but its use may create safety problems in the work place. Chlorine gas and noxious chlorine compounds are released when potassium chloride is the potassium source used in the process. The optimum amount of potassium bicarbonate to use will vary according to the amount of expanding clay impurities in the kaolin. On average, however, it appears to be in the range of about 0.05 to 0.2 percent, based on the weight of solids in the clay.

Preferably, the potassium compound will be dissolved in water prior to being mixed with the clay, e.g., at a solution strength of about 1 to 20 weight percent, preferably about 3 to 10 percent, calculated as cationic potassium.

The extent to which the slurry viscosity of the kaolinitic clay is lowered by the present treatment is proportional to the amount of potassium cations that are admixed with the clay, until the point of minimum achievable viscosity is reached. Usually it will be preferred to mix the clay with about 1 to 10 pounds (e.g., about 2 to 5 pounds) of the potassium source (calculated as cationic potassium) per ton of the clay (dry weight basis).

Preferably, the clay will be in aqueous slurry form when the potassium compound is mixed with it, e.g., as a slurry containing about 25 to 35 weight percent solids. The mixing can be carried out in various pieces of equipment, such as, for example, an agitated storage tank.

As stated above, the potassium-treated clay is heated in the present process to a temperature of at least about 100° C., e.g., a temperature within the range of about 100° to 250° C. (or 300° C.). If a temperature of 120° C. or above is used, the treatment will provide an added benefit. It will kill the most common forms of bacteria that are likely to contaminate the clay and possible discolor it. At the high end of the temperature range, however, the brightness of the clay can suffer and the clay can become unacceptably abrasive also, the added cost may outweight any enhancement of the viscosity reduction. Ordinarily, therefore, it will be preferred to operate no higher than about 200° C., e.g., in the range of about 120° to 200° C.

It is not known that the length of time that the treated clay is held at the elevated temperature is critical. It is contemplated, therefore, that the clay be held at about 100° C. or above for only an instance or for prolonged periods, for example, ½ hour or more, say up to about 5 hours, e.g., in the range of about 1 to 2 hours.

The heating step may be used, if desired, to evaporate the treated clay slurry to dryness, for example by spray drying or rotary drying. Alternatively, the treated clay, in the form of a wet filter cake, or slurry, may be heated in a pressure vessel, and just enough water be permitted to evaporate from the clay to produce a slurry having the desired solids content for shipment, e.g., approximately 60 to 70 weight percent.

The preferred embodiment of the process of the present invention is as follows:

High viscosity, raw, kaolinitic clay that has a significant content of degraded illite is degritted and fractionated by conventional kaolin processing methods to yield the desired particle size fraction. The solids content of the fraction is adjusted to about 25 to 35 weight percent. The resultant slurry is mixed with an aqueous solution of the potassium compound and the mixture is gently agitated for about 6 to 24 hours. Then the potassium-treated slurry is flocced with sulfuric acid and bleached. If an oxidizing bleach, e.g., sodium hypochlorite, is used, the bleach is mixed with the clay at a neutral pH (about 6 to 8) and the floccing with sulfuric acid is performed afterwards. Reducing bleaches, such as sodium hydrosulfite, operate at acidic pHs, however, and are preferably added to the clay after it has been flocced. For certain clays, such as the gray clays, ozone oxidation prior to floccing is recommended in order to improve brightness.

The resultant slurry is then filtered on a rotary drum filter to yield a pastelike filter cake having a solids content of about 58–65 weight percent. The filter cake is treated with a conventional dispersing agent for kaolin and its pH is adjusted to about 6 to 8. Then the clay is heated for about 1 to 2 hours in a stirred autoclave at a temperature of about 120° C. and a pressure of about 15 psig. The conditions in the autoclave are controlled so that at the end of the heat treatment the clay has a solids content of about 71 weight percent. The resultant product is a kaolinitic clay ready for shipment that has a substantially lower low shear slurry viscosity than it had prior to the treatment.

The following examples describe various experiments using the process of the present invention. Unless otherwise indicated, viscosities were measured at 71% solids content, following TAPPI Method No. T 648 su-72. (For low sheer viscosities, that entailed the use of a Brookfield Syncro-lectric Viscometer Model RVF 100 operating at 20 rpm with a No. 2 spindle). Unless otherwise indicated, percentages are by weight. Brightness was measured after ozonation and bleaching, following TAPPI Method No. T 646 os-75, and it is reported as percentage of the brightness of magnesium oxide. Particle size is reported as the percent, by weight, of the clay particles that had the indicated equivalent spherical diameters. The clay mineral contents of the samples were determined by X-ray diffraction and scanning electron microscopy techniques; they are reported as percentages, based on the total weight of clay minerals in the sample. The chemical compositions of the samples were determined by atomic absorption spectrophotometry and are reported as weight percentages. Because of the difficulty in doing so, the precise amount of degraded illite present before treatment in each of the clays used was not determined. Evidence was, however, that degraded illite probably accounted for at least 50 percent, by weight, of the expanding clay content in each of the samples. Where screen sizes are reported, they are in U.S. Seive Series.

EXAMPLE I

A gray, central Georgia kaolin contaminated with degraded illite and having a low shear viscosity of 1600 cps at 71% solids and pH 7 was treated with a KOH solution in the following manner.

The kaolin was a degritted fraction of which about 80 percent, by weight, of the particles had equivalent spherical diameters of less than 2 microns. A slurry was prepared using 1400 ml of H₂O and 600 grams of the kaolin. Sodium silicate was used as the dispersant in the slurry at a concentration equivalent to about 4½ lbs. per ton of clay (dry basis). Thirty milliliters of a 10% KOH solution was introduced into the slurry and the mixture was slowly agitated for 24 hours. A pH of 9.5 was obtained during this process. After 24 hours of saturation, the slurry was flocced with 25 ml. of 10% $H_2SO_4$ at a pH of 2.7. The flocced slurry was placed into filtering bowls and filtered to remove water, water-soluble salts, and excess KOH. Filter cake obtained from the filtering process was placed in a dryer set at 200° C. for two hours. The dried clay was remixed with water and sodium hexametaphosphate to form a 71% solids slurry. The pH of the slurry was adjusted to about 7 by addition of sodium hydroxide. Low shear viscosity measurements that were remeasured indicated 490 cps, a 70% decrease in low shear viscosity.

EXAMPLE II

A gray, central Georgia kaolin contaminated with degraded illite and having a low shear viscosity of 4,000 cps at 71% solids and pH 7 was treated with a $KHCO_3$ solution in the following manner.

The kaolin was a degritted fraction of which about 80 percent, by weight, of the particles had equivalent spherical diameters of less than 2 microns. A slurry was prepared using 1400 ml of $H_2O$ and 600 grams of the kaolin. Sodium silicate was used as the dispersant in the slurry—again at a concentration equivalent to about 4½ lbs. per ton of clay. Thirty milliliters of a 10% $KHCO_3$ solution was introduced into the slurry, which was then slowly agitated for 24 hours. A pH of 9.8 was obtained during this process. After 24 hours of saturation the slurry was flocced with 5 ml. of 50% alum at a pH of 5.1. The flocced slurry was placed into filtering bowls to remove water, water-soluble salts, and excess $KHCO_3$. Filter cake obtained from the filtering process was placed in a dryer set at 200° C. for two hours. The dried clay was remixed with water and sodium hexametaphosphate to form a 71% solids slurry. The pH of the slurry was adjusted with sodium hydroxide to about 7. Low shear viscosity measurements that were remeasured indicated 800 cps, an 80% decrease in low shear viscosity.

EXAMPLE III

A crude, white kaolin clay from a central Georgia deposit, containing some degraded illite, was washed, degritted, filtered, and dried in accordance with conventional clay processing techniques. Fractionation of the clay to 80%-less-than-2 micron-size produced a clay-water slurry having 30% solids. This crude clay generated a low shear viscosity of 2650 cps at 70.4% solids. Three portions of the fractionated clay (30% solids) were treated with three different $K^+$ salts. Each portion of slurry was treated with a 10% solution of one of the following compounds: KOH, $KHCO_3$, or $K_2SO_4$, for 24 hours under slow agitation. Following the saturation period the slurry was flocced with $H_2SO_4$. After the filtration process removed free $H_2O$, water-soluble salts, and excess $K^+$ salts, the filter cakes were placed in an air convection dryer set at about 105° C. The filtered, dried kaolin was then heated for two hours in an oven set at 200° C., after which it was removed with $H_2O$ and sodium silicate dispersant to form a 71% solids slurry. Low shear slurry viscosity, pH, and time fraction data were accumulated from the treated clays from each test run, as set forth in Table 1.

TABLE 1

| TEST SAMPLE | Wt. % Dispersant Added | pH | LOW SHEAR VISCOSITY, cps | | | | |
|---|---|---|---|---|---|---|---|
| | | | Initial | 24 hours | 48 hours | 72 hours | 240 hours |
| Control - no heat | 0.6 | 9.1 | 2650 | 2750 | 2850 | 3360 | 2660 |
| KOH | 0.5 | 8.4 | 1495 | 1680 | 1700 | 1760 | 1610 |
| $KHCO_3$ | 0.4 | 8.9 | 1740 | 1760 | 1760 | 1760 | 1610 |
| $K_2SO_4$ | 0.5 | 8.7 | 1800 | 1850 | 1940 | 1930 | 1800 |

EXAMPLE IV

A second specimen of degritted, crude, white kaolin clay (original pH:4.6), in the form of an aqueous slurry having a 30% solids content, was processed in substantially the same manner as described in Example III. This particular clay, also obtained from central Georgia, had the following properties after degritting, floccing, filtering, and drying:

Particle Size: 80% less than 2 microns
Brightness: 89.1%
Low Shear Viscosity: 17,000 cps.
pH at Time of Viscosity Measurement: 8.1

| Clay Mineral Content | |
|---|---|
| Expanding Clays: | 4% |
| Mica (fine grain, like illite): | 1% |
| Halloysite: | 5% |
| Kaolinite: | 90% |

Utilizing the same $K^+$ salts used in Example III, and in the same amounts, and employing the same heat parameters, the following table illustrates the low shear viscosity reduction results obtained.

TABLE 2

| TEST SAMPLE | Wt. % Dispersant Added | pH | LOW SHEAR VISCOSITY, cps | | | | | |
|---|---|---|---|---|---|---|---|---|
| | | | INITIAL | 24Hrs. | 48Hrs | 196Hrs | 264Hrs | 720Hrs |
| Control- no heat | 0.35 | 7.7 | 17,000 | 52,000 | 52,000 | 50,000 | 36,800 | 20,000 |
| KOH | 0.25 | 7.8 | 6,400 | 5,860 | 5,700 | 6,270 | 6,140 | 4,350 |
| $KHCO_3$ | 0.25 | 8.4 | 4,020 | 4,550 | 4,600 | 4,700 | 4,740 | 4,100 |
| $K_2SO_4$ | 0.25 | 7.3 | 6,650 | 8,820 | 9,500 | 9,850 | 9,800 | 9,800 |

EXAMPLE V

Another gray, central Georgia kaolin that was contaminated with degraded illite was subjected to the treatment of the present invention. First a control sample of the crude clay, which had a pH of 5.1, was degritted by screening through a 200 mesh screen, followed by sedimentation. The degritted clay was flocced with sulfuric acid to a pH of about 3.0 to 3.5 and then filtered. The filter cake was placed in a 105° C. oven until it was dry. Thus prepared, the control sample had the following properties:
Particle Size: 81% less than 2 microns
Brightness: 87.7%
Low Shear Viscosity: 880 cps.
High Shear Viscosity: 900 RPM
pH At Time of Viscosity Measurement: 8.4

| Clay Mineral Content | |
|---|---|
| Expanding Clays: | 4% |
| Mica (fine grain, like illite): | 2% |
| Kaolinite: | 94% |
| Chemical Composition | |
| $SiO_2$: | 43.74% |
| $Al_2O_3$: | 38.95% |
| $Fe_2O_3$: | 0.46% |
| MgO: | 0.36% |
| $K_2O$: | 0.25% |
| $TiO_2$: | 1.01% |
| Structural $H_2O$: | 13.54% |

A second (treatment) sample of the same crude clay was degritted in the manner just described. After degritting, this sample was adjusted to a solids content of 35%; then a 10% aqueous solution of potassium carbonate was added to the clay in an amount sufficient to provide 0.2% of $K_2CO_3$, based on the solids content of the slurry. The clay slurry was slowly mixed for six hours and then flocced with sulfuric acid to a pH of about 3.0 to 3.5. Then the slurry was filtered. The filter cake was dried in a 105° C. oven, then heated in a 200° C. oven for two hours. After being reconstituted to 71% solids content, the resulting clay exhibited a low shear viscosity of 448 cps.

EXAMPLE VI

A third portion of the crude kaolin clay used in Example V was treated in the same manner as in the treatment sample in that example, except that 0.2% potassium citrate was used instead of potassium carbonate. The low shear viscosity of the clay was reduced to 520 cps.

EXAMPLE VII

A fourth portion of the crude kaolin clay used in Example V was treated in the same manner as the treatment sample in that example, except that 0.05% potassium bicarbonate was used instead of potassium carbonate. The low shear viscosity of the clay was reduced to 500 cps.

EXAMPLE VIII

A fifth portion of the crude kaolin clay used in Example V was treated in the same manner as the treatment sample in that example, except that 0.1% potassium bicarbonate was used instead of potassium carbonate. The low shear viscosity of the clay was reduced to 432 cps.

EXAMPLE IX

A sixth portion of the crude kaolin clay used in Example V was treated in the same manner as the treatment sample in that example, except that 0.075% potassium bicarbonate was used instead of potassium carbonate. The low shear viscosity of the clay was reduced to 688 cps.

EXAMPLE X

Another gray, central Georgia kaolin that was contaminated with degraded illite was subjected to the treatment of the present invention. Again a control sample of the crude clay, which had a pH of 4.8, was degritted by screening through a 200 mesh screen, followed by sedimentation. The degritted clay was flocced with sulfuric acid, to a pH of about 3.0 to 3.5, and then filtered. The filter cake was dried in a 105° C. oven. Thus prepared, the control sample had the following properties:
Particle Size: 80% less than 2 microns
Brightness: 85.6%
Low Shear Viscosity: 1528 cps.
High Shear Viscosity: 2.3 dynes
pH At Time of Viscosity Measurement: 7.4

| Clay Mineral Content | |
|---|---|
| Expanding Clays: | 6% |
| Mica (fine grain, like illite): | 1% |
| Kaolinite: | 93% |
| Chemical Composition | |
| $SiO_2$: | 42.6% |
| $Al_2O_3$: | 39.3% |
| $Fe_2O_3$: | 0.5% |
| MgO: | 0.49% |
| $K_2O$: | 0.41% |
| $TiO_2$: | 0.92% |
| Structural $H_2O$: | 14.1% |

A second (treatment) sample of the same crude clay was degritted in the manner just described. After degritting, this sample was adjusted to a solids content of 36%; then a 10% aqueous solution of KOH was added to the clay in an amount sufficient to provide 0.2% of KOH, based on the solids content of the slurry. The resulting mixture was slowly blended for 18 hours and then flocced with sulfuric acid to a pH of about 3.0 to 3.5. Then the slurry was filtered. The filter cake, which contained about 60% solids, was placed for two hours in an autoclave maintained at 120° C. and 15 psig pressure. A portion of the water evaporated under those conditions, adjusting the solids content to about 70.5%. At that solids content the resulting clay exhibited a low shear viscosity of 870 cps.

EXAMPLE XI

A third portion of the crude kaolin clay used in Example X was degritted in the same manner as the control sample in that example. After degritting, the solids content of this sample was adjusted to 36%; then a 10% aqueous solution of potassium hydroxide was added to the clay in an amount to provide 0.2% KOH, based on the solids content of the slurry. The mixture was slowly blended for 24 hours and then flocced with sulfuric acid to a pH of about 3.0 to 3.5. Then the slurry was filtered. The filter cake was dried in a 105° C. oven, following which it was heated in a 190° C. oven for two hours. The low shear viscosity of the clay was reduced to 610 cps.

EXAMPLE XII

A blend of two, white, central Georgia kaolin clays that contained degraded illite was subjected to the treatment of the present invention. First a control sample of the crude clay was degritted by screening through a 200 mesh screen, followed by sedimentation. After degriting, the clay was flocced with sulfuric acid to a pH of about 3.0 to 3.5, filtered, and dried in a 105° C. oven. Thus prepared, the control sample had the following properties:

Particle Size: 80.5% less than 2 microns
Brightness: 89.6%
Low Shear Viscosity: 395 cps.
High Shear Viscosity: 1.1 dynes
pH At Time of Viscosity Measurement: 7.8

| Clay Mineral Content | |
|---|---|
| Expanding Clays: | 3% |
| Mica (fine grain, like illite): | 0.5% |
| Kaolinite: | 96.5% |

A second (treatment) samples of the same crude clay was degritted in the manner just described. After degritting, this sample was adjusted to a solids content of 35%; then a 10% aqueous solution of potassium bicarbonate was added to the clay in an amount sufficient to provide 0.1% of $KHCO_3$, based on the solids content of the slurry. The resulting mixture was slowly blended for six hours, then flocced with sulfuric acid to a pH of about 3.0 to 3.5. Then the slurry was filtered. The filter cake was dried in a 105° C. oven. The resulting clay exhibited a low shear viscosity of 345 cps.

EXAMPLE XIII

A third portion of the crude kaolin clay used in Example XII was treated in the same manner as the treatment sample in that example, except that once the filter cake was dry, it was held in a 200° C. oven for two more hours. The low shear viscosity of the clay was reduced to 310 cps.

EXAMPLE XIV

A composite sample of a gray, central Georgia kaolin that was contaminated with degraded illite was subjected to the treatment of the present invention. The sample was a mixture of random segments of a core sample that had been cut out of the deposit. A control sample of the crude clay, which had a pH of 5.1, was first degritted by screening through a 200 mesh screen, followed by sedimentation. After degritting, the clay was flocced with sulfuric acid to a pH of about 3.0 to 3.5, and then filtered. The filter cake was dried in a 105° C. oven. Thus prepared, the control sample had the following properties:

Particle Size: 81% less than 2 microns
Brightness: 87.1%
Low Shear Viscosity: 2120 cps.
High Shear Viscosity: 8 dynes
pH At Time of Viscosity Measurement: 8.3

| Clay Mineral Content | |
|---|---|
| Expanding Clays: | 6% |
| Mica (fine grain, like illite): | 2% |
| Kaolinite: | 92% |
| Chemical Composition | |
| $SiO_2$: | 43.6% |
| $Al_2O_3$: | 38.7% |
| $Fe_2O_3$: | 0.51% |
| MgO: | 0.48% |
| $K_2O$: | 0.38% |
| $TiO_2$: | 1.1% |
| Structural $H_2O$: | 13.6% |

A second (treatment) sample of the same crude clay was degritted in the manner just described. After degritting, this sample was adjusted to a solids content of 40%; then a 10% aqueous solution of potassium carbonate was added to the clay in an amount sufficient to provide 0.1% of $K_2CO_3$, based on the solids content of the slurry. The resulting mixture was slowly blended for 24 hours, then flocced with sulfuric acid to a pH of about 3.0 to 3.5. The slurry was filtered and the filter cake was dried in a 105° C. oven. The resulting clay exhibited a low shear viscosity of 1280 cps.

EXAMPLE XV

A third portion of the crude clay used in Example XIV was treated in the same manner as the treatment sample in that example, except that instead of drying the $K+$ treated filter cake it was heated for two hours in a pressure reactor maintained at 120° C. and 15 psig pressure. In the course of the heating, the solids content of the clay increased, due to partial evaporation of the water, from about 60% to about 71%. The low shear viscosity of the clay was reduced by the treatment to 920 cps.

EXAMPLE XVI

Yet another gray, central Georgia kaolin that contained degraded illite was subjected to the treatment of the present invention. First a control sample of the crude clay was degritted by screening through a 200 mesh screen, followed by sedimentation. Then the clay was flocced with sulfuric acid to a pH of about 3.0 to 3.5, then filtered. The filter cake was dried in a 105° C. oven. Thus prepared, the control sample had the following properties:

Particle Size: 81% less than 2 microns
Brightness: 86.5%
Low Shear Viscosity: 2360 cps.
pH At Time of Viscosity Measurement: 7.8

| Clay Mineral Content | |
|---|---|
| Expanding Clays: | 6% |
| Mica (fine grain, like illite): | 2% |
| Kaolinite: | 92% |

A second (treatment) sample of the same crude clay was degritted in the manner just described. After degritting, this sample was adjusted to a solids content of 35%; then a 10% aqueous solution of potassium carbonate was added to the clay in an amount sufficient to provide 0.2% of $K_2CO_3$, based on the solids content of the slurry. The resulting mixture was slowly blended for six hours, then flocced with sulfuric acid to a pH of about 3.0 to 3.5. The slurry was filtered, and the filter cake was dried in a 105° C. oven. The dried clay was divided into three fractions, each of which was then heated in an oven for two more hours. The oven temperatures during the additional heating step and the low shear viscosities of the resulting clays were as follows:

| Fraction | Oven Temperature | Low Shear Viscosity |
|---|---|---|
| 1 | 105° C. | 2000 cps. |
| 2 | 150° C. | 1200 cps. |
| 3 | 200° C. | 785 cps. |

I claim:

1. A process of reducing the viscosity of a raw kaolinitic clay slurry, said slurry being made from a clay that is contaminated with degraded illite and has a low shear viscosity of at least about 1000 centipoises, as determined by TAPPI Procedure No. T 648 su-72 with the pH of the slurry at the point within the range of about 6 to 8 at which the slurry exhibits the lowest low shear viscosity, by
   (a) admixing said slurry with a source of cationic potassium in a ratio of about 1 to 10 pounds of the potassium source (calculated as cationic potassium) per ton of the clay (dry weight basis), said potassium source being a water-soluble potassium compound;
   (b) heating the mixture of clay, potassium source and water to a temperature of about 100° to 300° C. either (i) by drying the slurry at a temperature of about 100° to 300° C., without calcining the clay, and then reslurrying the clay in water, or (ii) heating the slurry to a temperature of about 100° to 300° C. without drying or calcining the clay; and
   (c) recovering a kaolinitic clay slurry having a low shear viscosity substantially lower than that of the raw clay slurry, when measured at the same solids content.

2. The process of claim 1 wherein the potassium-treated clay is heated to a temperature in the range of about 120° to 200° C.

3. The process of claim 1 wherein the source of cationic potassium used is one or more compounds selected from the group consisting of potassium hydroxide, potassium bicarbonate, potassium carbonate, potassium sulfate, potassium chloride, and potassium citrate.

4. The process of claim 1 wherein the source of the cationic potassium is potassium bicarbonate.

5. The process of claim 1 wherein the admixture of the clay and the source of cationic potassium is blended for about 6 to 24 hours prior to the heating step.

6. The process of claim 1 wherein the source of cationic potassium is dissolved in water prior to being mixed with the clay.

7. The process of claim 6 wherein the solution of the source of cationic potassium has a concentration of about 1 to 20 weight percent, calculated as cationic potassium.

8. The process of claim 1 wherein the kaolinitic clay that is mixed with the source of cationic potassium is a fraction of which at least 50 percent of the particles (based on the weight of the clay) have equivalent spherical diameters of less than 2 microns.

9. The process of claim 1 wherein the clay that is mixed with the source of cationic potassium is in the form of an aqueous slurry containing about 25 to 35 weight percent solids.

10. The process of claim 1 wherein the clay being treated has a low shear, slurry viscosity prior to the treatment of at least about 1000 centipoises, as determined by TAPPI Procedure No. T 648 su-72 with the pH of the slurry at the point within the range of about 6 to 8 at which the slurry exhibits the lowest low shear viscosity.

11. A process of reducing the viscosity of a raw kaolinitic clay slurry, said slurry being made from a clay that is contaminated with about 2 to 15 percent of one or more expanding clays, based on the weight of solids in the clay, wherein at least 50 weight percent of said expanding clay contaminant is made up of degraded illite, said clay having a low shear viscosity of at least about 1000 centipoises, as determined by TAPPI Procedure No. T 648 su-72 with the pH of the slurry at the point within the range of about 6 to 8 at which the slurry exhibits the lowest lowshear viscosity, by
   (a) admixing said slurry, containing about 25 to 35 weight percent solids, with a source of cationic potassium in a ratio of about 1 to 10 pounds of the potassium source (calculated as cationic potassium) per ton of the clay (dry weight basis), said potassium source being selected from the group consisting of potassium hydroxide, potassium bicarbonate, potassium carbonate, potassium sulfate, potassium chloride, and potassium citrate;
   (b) blending said mixture for about 6 to 24 hours;
   (c) filtering the blended mixture to obtain a filter cake containing about 58 to 65 weight percent solids;
   (d) heating and stirring the filter cake in a pressure vessel maintained at a temperature in the range of about 120° to 200° C. for about ½ hour to 5 hours, while allowing sufficient water to evaporate from the filter cake to adjust its solids content to approximately 60 to 70 weight percent, without calcining the clay; and
   (e) recovering a kaolinitic clay slurry having a low shear viscosity substantially lower than that of the raw clay slurry, when measured at the same solids content.

12. The process of claim 11 wherein the potassium source is potassium bicarbonate, which, in step (a), is admixed with the clay in an amount of about 0.05 to 0.2 percent, based on the dry solids weight of the clay.

13. The process of claim 11 wherein, in step (d), the filter cake is heated and stirred for about 1 to 2 hours, and the pressure vessel is maintained at about 120° to 190° C.

14. In the method of using a kaolinitic clay that is contaminated with degraded illite as a paper coating by forming an aqueous slurry of the clay at a first location, transporting said slurry to a second location, and coating paper with said clay at said second location, the improvement wherein the clay, prior to being transported to the second location, and while in the form of a raw clay slurry having a low shear viscosity of at least about 1000 centipoises, as determilned by TAPPI Procedure No. T 648 su-72 with the pH of the slurry at the point within the range of about 6 to 8 at which the slurry exhibits the lowest low shear viscosity, is treated to reduce its viscosity by
   (a) admixing said slurry with a source of cationic potassium in a ratio of about 1 to 10 pounds of the potassium source (calculated as cationic potassium) per ton of the clay (dry weight basis), said potassium source being a water-soluble potassium compound;
   (b) heating the mixture of clay, potassium source and water to a temperature of about 100° to 300° C. either (i) by drying the slurry at a temperature of about 100° to 300° C., without calcining the clay, and then reslurrying the clay in water, or (ii) by heating the slurry to a temperature of about 100° to 300° C. without drying or calcining the clay; and (c) recovering a kaolinitic clay slurry having a low shear viscosity substantially lower than that of the raw clay slurry, when measured at the same solids content.

15. The method of claim 14 wherein the potassium-treated clay is heated to a temperature in the range of about 120° to 200° C.

16. The method of claim 14 wherein the source of cationic potassium used is one or more compounds selected from the group consisting of potassium hydroxide, potassium bicarbonate, potassium carbonate, potassium sulfate, potassium chloride, and potassium citrate.

17. The method of claim 14 wherein the source of the cationic potassium is potassium bicarbonate.

18. The method of claim 14 wherein the admixture of the clay and the source of cationic potassium is blended for about 6 to 24 hours prior to the heating step.

19. The method of claim 14 wherein the source of cationic potassium is dissolved in water prior to being mixed with the clay.

20. The method of claim 14 wherein the solution of the source of cationic potassium has a concentration of about 1 to 20 weight percent, calculated as cationic potassium.

21. The method of claim 14 wherein the kaolinitic clay that is mixed with the source of cationic potassium is a fraction of which at least 50 percent of the particles (based on the weight of the clay) have equivalent spherical diameters of less than 2 microns.

22. The method of claim 1 wherein the clay that is mixed with the source of cationic potassium is in the form of an aqueous slurry containing about 25 to 35 weight percent solids.

23. In the method of using a kaolinitic clay that is contaminated with degraded illite as a paper coating by forming an aqueous slurry of the clay at a first location, transporting said slurry to a second location, and coating paper with said clay at said second location, the improvement wherein the clay, prior to being transported to the second location, and while in the form of a raw clay slurry having a low shear viscosity of at least about 1000 centipoises, as determined by TAPPI Procedure No. T 648 su-72 with the pH of the slurry at the point within the range of about 6 to 8 at which the slurry exhibits the lowest low shear viscosity, is treated to reduce its viscosity by (a) admixing said slurry of the clay, containing about 25 to 35 weight percent solids, with a source of cationic potassium selected from the group consisting of potassium hydroxide, potassium bicarbonate, potassium carbonate, potassium sulfate, potassium chloride, and potassium citrate, the ratio of the ingredients being about 1 to 10 pounds of the potassium source (calculated as cationic potassium) per ton of the clay (dry weight basis);

(b) blending said mixture for about 6 to 24 hours;

(c) filtering the blended mixture to obtain a filter cake containing about 58 to 65 weight percent solids;

(d) heating and stirring the filter cake in a pressure vessel maintained at a temperature in the range of about 120° to 200° C. for about ½ hour to 5 hours, while allowing sufficient water to evaporate from the filter cake to adjust its solid content to approximately 60 to 70 weight percent, without calcining the clay; and (e) recovering a kaolinitic clay slurry having a low shear viscosity substantially lower than that of the raw clay slurry, when measured at the same solids content.

24. The method of claim 23 wherein the potassium source is potassium bicarbonate, which, in step (a), is admixed with the clay in an amount of about 0.05 to 0.2 percent, based on the dry solids weight of the clay.

25. The method of claim 24 wherein, in step (d), the filter cake is heated and stirred for about 1 to 2 hours, and the pressure vessel is maintained at about 120° to 190° C.

* * * * *